Dec. 17, 1968     D. HUMPHRISS     3,416,856
SUBJECTIVE SIGHT-TESTING EQUIPMENT
Filed April 11, 1963     2 Sheets-Sheet 1

INVENTOR
DERYCK HUMPHRISS
By Irwin D. Thompson
ATTY.

Dec. 17, 1968  D. HUMPHRISS  3,416,856
SUBJECTIVE SIGHT-TESTING EQUIPMENT
Filed April 11, 1963  2 Sheets-Sheet 2

INVENTOR
DERYCK HUMPHRISS
By Irwin L. Thompson
ATTY.

3,416,856
SUBJECTIVE SIGHT-TESTING EQUIPMENT
Deryck Humphriss, 56 Cranbourne Ave.,
Benoni, Republic of South Africa
Filed Apr. 11, 1963, Ser. No. 272,291
Claims priority, application Great Britain, Apr. 26, 1962,
16,022/62
6 Claims. (Cl. 351—17)

This invention relates to sight-testing and is concerned particularly with a method and apparatus for testing whether a patient has the ocular condition known as heterophoria, whereby the eyes have a reduced tendency to operate together and one eye tends to turn inwards or outwards relative to the other.

It is an object of the invention to provide improved sight-testing apparatus for testing for this condition and aiding the optician to prescribe spectacles for correcting it.

According to the method of the invention, in testing for heterophoria or measuring the extent thereof, the patient looks at an illuminated or light-coloured object on a dark ground, and a plus lens is placed in front of one eye whilst a prism is held before the other eye. The vision of the eye before which the plus lens is placed is blurred, whilst that of the other eye should be clear. The clear and blurred images cannot be fused by the central binocular vision; in the peripheral vision, clarity is not necessary for fusion to take place, but the strength of the binocular vision is reduced in proportion to the power of the lens used.

If a patient has heterophoria, but the strength of the binocular fusion is sufficient to hold the eyes in their correct position, then the placing of the plus lens before one eye lowers the fusional strength, so that fusion breaks down and double vision results. Placing of a prism before the other eye can restore the binocular vision.

The invention will be described with reference to certain preferred embodiments thereof as shown in the accompanying drawings, in which.

One form of sight-testing apparatus according to the invention is for determining the minimum relieving prism required for a subject known or suspected to be suffering from heterophoria. This apparatus comprises a small bright light placed on a dark background which also bears, surrounding the light, an illuminated motif, the size of the motif being such as to be visible with the peripheral vision when the apparatus is placed a convenient distance from the subject and the subject's eye is fixated on the light. Use of a red light gives the best results.

One convenient form of this apparatus consists in a dark-coloured board of 9 inch side, in the centre of which is a small bright red light, and toward the periphery of which is a strip, about one inch in width, forming a motif in the shape of a square, this strip may be painted white, or may be of translucent material illuminated from the rear. In another embodiment the motif is starlike and consists of a number of strips directed inwardly toward the lamp, but not reaching it; good results have been obtained with the use of four strips, forming a centreless cross.

Figure 3:
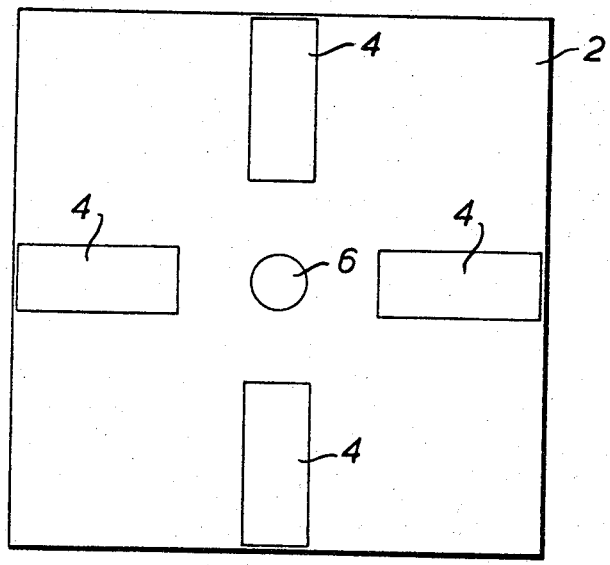
FIG. 3 shows an apparatus bearing a centreless cross motif.

Apparatus of this latter kind is illustrated in FIG. 3 of the accompanying drawings, which shows a dark-coloured board of 9 inch side bearing four strips of frosted glass or other translucent material; each strip is 4 inches in width and its inner margin is 2 inches from the centre of the board, so that the strips are only present on the outer portion of the board. At the centre of the board there is a hole ⅜ inch in diameter, behind which is placed a red filter and a lamp bulb; the lamp can also serve for the illumination of the strips or separate lamps may be used for this purpose. Letters, numerals or symbols may be placed in the corners of the board on the dark background for use in other sight testing procedures.

The procedure for the use of the aforesaid apparatus in the measurement of heterophoria is as follows: A +1.25 D spherical lens is placed (for instance in a conventional sight-testing spectacle frame) before one eye; the light then appears to this eye as a round blur which cannot be fused with the clear image thereof seen by the other eye; the illuminated cross or square motif (the peripheral fusional lock) appears slightly blurred. If the subject under investigation has a heterophoria and so requires a relieving prism, the eye moves from its position of linked fixation, binocular vision collapses, and two lights are seen, one clear and the other blurred. Prismatic power is now placed before the other eye, bringing the lights towards each other, until the fusional compulsion causes the two light crosses or squares to fuse into one, when one light is seen. The prism which has achieved this effect is that prism which is required to relieve the strain on the fusional strength, without over-correction.

In another form of sight-testing apparatus according to the invention, the principle of blurring the vision, so that one eye does not record detail, is also used as a screening method for normal or abnormal vision, including heterotrophia, and this apparatus, comprising a mask and a chart, will be described in conjunction with the drawing.

Figure 1:
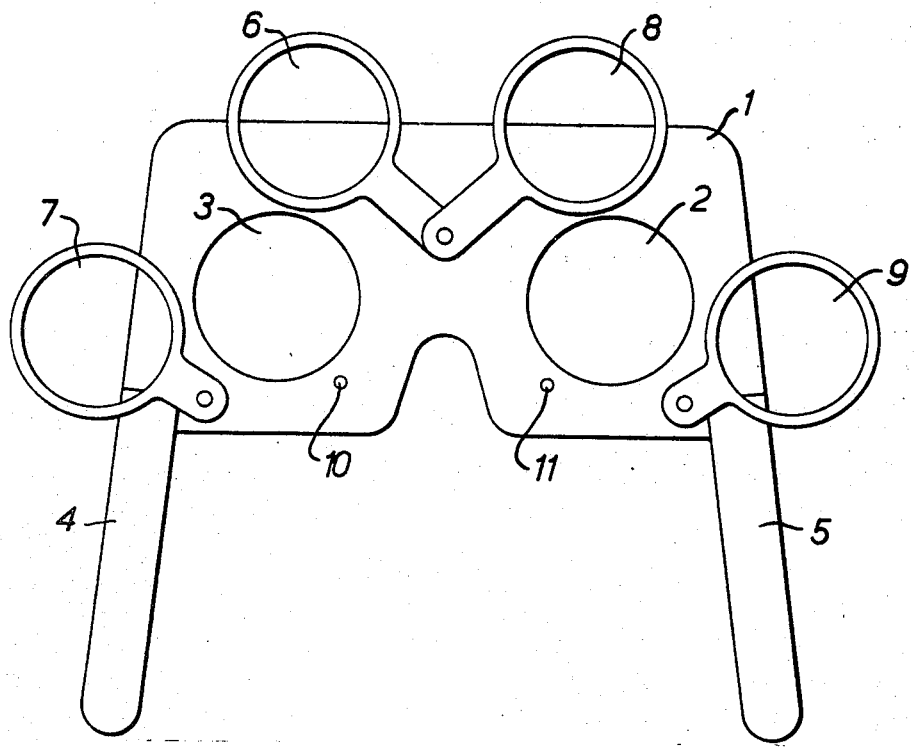
FIG. 1 shows a mask.

Referring to FIG. 1, a mask comprises a frame 1 in which are two holes 2 and 3, of diameter 1¼", with their centres separated by a distance of 2½", this spacing permits any subject to see with both eyes through the holes, irrespective of his precise interocular spacing. The mask is provided with handles 4, 5,

Four lenses are mounted pivotally on the mask so that any two can be positioned before the R or L eyes. The lenses are:

For the R eye: a plus 2.00 D sphere, 6, and a red glass filter 7.

For the L eye: a plus 2.00 D lens, 8 and a 6.00 D prism, 9, located base down.

Two stops 10 and 11 are arranged to limit the movement of the lenses so as to position them over the holes 2 and 3.

Figure 2:
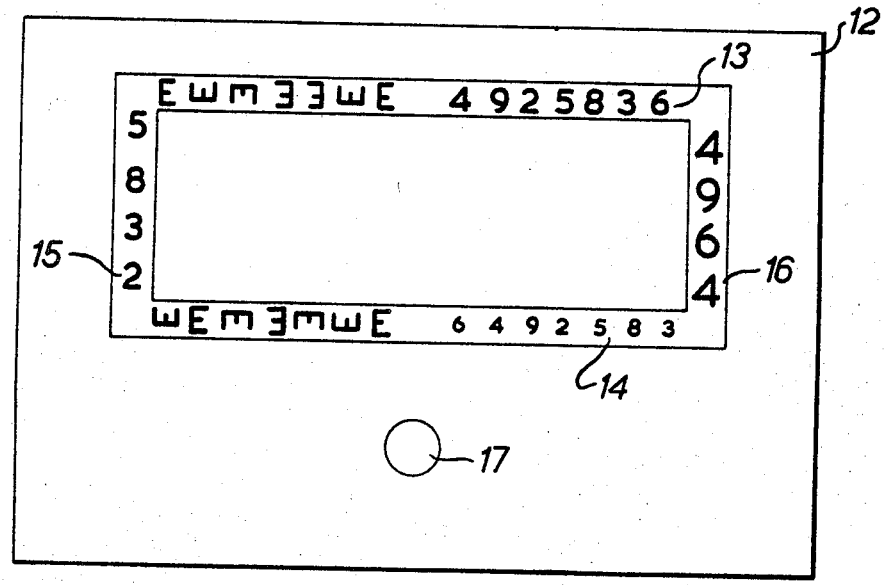
FIG. 2 shows a testing chart for use with a mask.

The mask is designed to be used with a chart which is shown in FIG. 2. This chart consists of a black background 12 bearing a rectangle made of white strips. Suitable dimensions are as follows. The background is 18" x 12", the two horizontal strips 13, 14 are ¾ in. wide and 16 in. long, and the two vertical strips 15, 16 are 1 in. wide and 5¼ in. high. The area enclosed in the rectangle is thus the area which is covered by the projection at 10 ft. of the normal limits of angular deviation of one eye from the parallel when binocular vision is destroyed by a dissociating device. A white circle 17, 1 in. in diameter, is placed 6½ in. below the centre of rectangle. Letters of a visual acuity rating 6/9 (at the viewing distance of 10 feet) are printed on the horizontal strips and numbers of a visual acuity rating 6/12, 6/18 and 6/24 are printed on the vertical strips. Some of these letters or numbers are red or green in colour. A series of letters, e.g., the letter E, in normal and inverted positions may also be present on the chart for testing illiterates.

The procedure for the use of the mask and the chart is as follows.

The subject to be tested stands 10 ft. from the chart, which is illuminated by normal room lighting. The subject holds the mask by the two handles 4, 5 so that the mask is placed centrally before his face.

If the frame of the mask is 3½" high and 7" across, the subject looks straight ahead, and the mask is so positioned that it is ½ in. in front of the apices of the cornea, then the angular vision at the side of the mask is in the peripheral field at an angle exceeding 70° from the line of vision straight ahead. An angle of 140° of field of vision is considered normal so that if when looking ahead through the mask, movement of a pencil can be recognised at the side of the mask, then the subject can be considered as having normal fields of vision.

The two plus lenses 6, 8 are positioned over the holes 2, 3 before the R and L eyes; if the subject is normal, none of the numbers on the chart can be read: if the subject is considerably long-sighted, the letters can be read. This test screens the subject for excessive long sight (hypermetropia). The plus lens 6 is removed from the R eye, but the lens 8 is left before the L eye if the subject cannot read the smaller numbers, in which case there is a defect of vision in the R eye.

The plus lens is then placed before the R eye and removed from the L eye; if the subject cannot now read the smaller letters of the 6/9 visual acuity rating, there is a defect in that eye. Both lenses are removed and the subject is asked to name the numbers in the various colours; if he cannot do so then the subject has a major colour blindness deficiency.

The red glass 7 is then placed over the hole 3 before the R eye and the prism 9 before the L eye. This has the effect of making the chart appear double, so that with a normal subject a red rectangle 14 is seen and inside it the white spot 17. If the subject sees the spot 17 outside the chart or cannot see both the spot 17 and the rectangle 14 at the same time, then he has abnormal binocular vision.

I claim:

1. Sight-testing apparatus comprising a chart having a light-coloured rectangular frame on a dark background, a coloured area located on the background outside the rectangular frame and adjacent a longer axis thereof, a mask for use with the chart, said mask comprising a frame having a pair of apertures separated by approximately the interocular distance, two lenses of positive power, each lens being pivotable to cover a respective aperture and a coloured filter pivotable over one aperture and a prism pivotable over the other.

2. Sight-testing apparatus as recited in claim 1 in which the lenses are of 2.00 diopter power and the prism is of 6.00 diopter power and is located base down when in the operative position.

3. Sight-testing apparatus as recited in claim 1 in which the size of the frame is such that, when the mask is placed ½ in. in front of the corneal apices, the angular vision at the side of the mask is in the peripheral field at an angle exceeding 70° from the line of vision ahead.

4. Sight-testing apparatus comprising a chart having a light-coloured rectangular frame on a dark background, a coloured area located on the background outside the rectangular frame and adjacent a longer axis thereof, the total area enclosed in the rectangular frame being that area covered by the projection at a distance of 10 feet of the normal limits of angular deviation of one eye from the parallel when binocular vision is destroyed, a mask for use with the chart, said mask comprising a frame having a pair of apertures separated by approximately the interocular distance, two lenses of positive power, each lens being pivotable to cover a respective aperture, a coloured filter pivotable over one aperture and a prism pivotable over the other.

5. Sight-testing apparatus as recited in claim 4 in which the lenses are of 2.00 diopter power and the prism is of 6.00 diopter power and is located base down when in the operative position.

6. Sight-testing apparatus as recited in claim 4 in which the size of the frame is such that, when the mask is placed ½ in. in front of the corneal apices, the angular vision at the side of the mask is in the peripheral field at an angle exceeding 70° from the line of vision ahead.

References Cited

UNITED STATES PATENTS

| | | | |
|---|---|---|---|
| 276,732 | 5/1883 | Trowbridge | 351—26 |
| 1,478,089 | 12/1923 | Wolff | 351—39 |
| 1,557,328 | 10/1925 | Rees | 351—4 |
| 1,636,450 | 7/1927 | Ames | 351—3 X |
| 2,326,965 | 8/1943 | Neumueller | 351—17 |
| 2,376,554 | 5/1945 | Ranoe | 351—4 |
| 3,082,763 | 3/1963 | McLaughlin | 351—3 X |

FOREIGN PATENTS 831,991  4/1960  Great Britain.

DAVID H. RUBIN, *Primary Examiner.*

U.S. Cl. X.R.

351—4, 32